(No Model.)
R. D. KINNEY.
HEAT MOTOR PLANT.
No. 521,910.  Patented June 26, 1894.
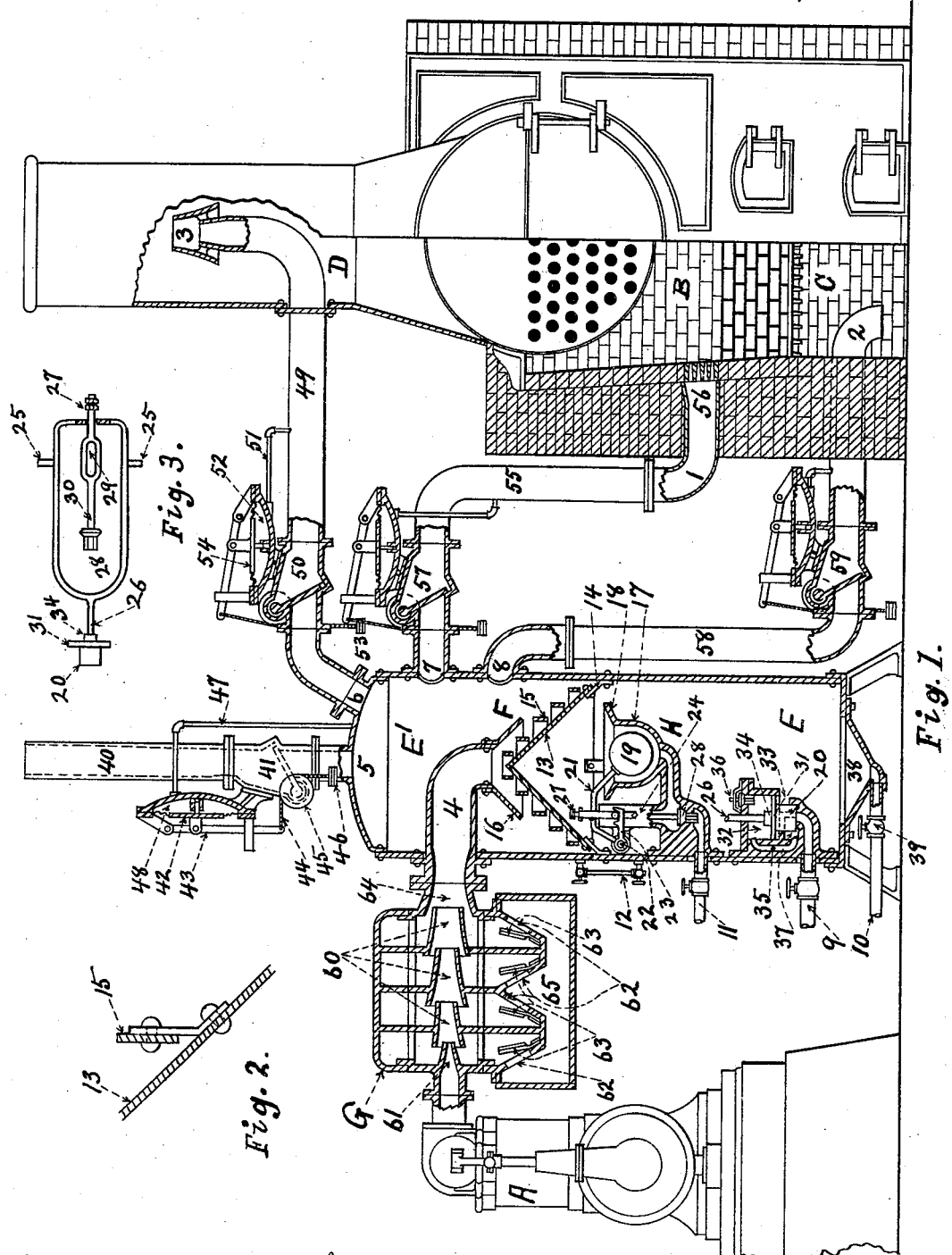
Witnesses.
Inventor.
Rob. D. Kinney

UNITED STATES PATENT OFFICE.

ROBERT D. KINNEY, OF PHILADELPHIA, PENNSYLVANIA.

HEAT-MOTOR PLANT.

SPECIFICATION forming part of Letters Patent No. 521,910, dated June 26, 1894.

Application filed March 24, 1894. Serial No. 504,997. (No model.)

*To all whom it may concern:*

Be it known that I, ROBERT D. KINNEY, a citizen of the United States, residing at Philadelphia, in the county of Philadelphia and State of Pennsylvania, have invented certain new and useful Improvements in Heat-Motor Plants, of which the following is a specification.

My invention relates to improvements in that class of heat motor plants in which a furnace is used for the combustion of fuel for the purpose of generating steam from water introduced into a boiler and the steam so generated is used through and exhausted or discharged from an engine for purposes of mechanical power; and the object of my improvement is to provide, arranged in series for co-operative action, first, an artificial draft system for the furnace whereby the initial expense for equipment is very much less than that required in the installation of such system under practices and methods heretofore known and used for an equivalent capacity for service, and possessing complete flexibility with reference to the varying requirements of fuel combustion in such furnaces. Second, an apparatus whereby hydrogen and oxygen in a heated condition are economically introduced into the furnace and a more perfect combustion and utilization of the fuel thereby secured and an increased amount of heat generated, and hence an economical saving in fuel, and lessening of initial expense in equipment, for equivalent capacity for service, in respect to the furnace proportions under practices and methods heretofore known and used, are effected. Third, an apparatus whereby heat in the exhaust-steam discharged from the engine is utilized in heating the furnace-combustion-blast, as also through the condensation of said exhaust steam and its return as feed water to the boiler, whereby an efficient reclaiming of waste heat is obtained. Fourth, an improved means for separating from the exhaust-steam discharged from the engine any oil and metallic grit, dirt, &c., which may be carried over from the engine-cylinder, and for collecting and discharging the same from the system of the plant into receptacles or conduits provided for receiving the same, respectively. Fifth, an apparatus for condensing the exhaust steam discharged from the engine, by means of a current of air, and reclaiming the condensed water for use over again as feed-water to the boiler; a feature of great practical value in localities where the natural water-supply is unfit for steam-engine boiler feed-water, or where the water supply is expensive to obtain, and further, the nuisance caused by the depositing of oil and water from atmospheric discharges of exhaust-steam from the engine when operated in communities where condensing by water is commercially and otherwise impracticable, can thereby be cheaply avoided and abated. Sixth, an apparatus whereby artificial draft for furnace combustion is obtained without impairing the efficiency of the plant, as a heat motor, through the dissipation of heat energy from the boiler for operating machinery of transmission or other devices for moving air and gases for purposes of artificial draft. I attain these objects by the apparatus illustrated in the accompanying drawings, in which—

Figure 1 is a vertical section of the apparatus as arranged in series for co-operative action. Fig. 2 is an enlarged vertical section showing a detail of the preferred manner of construction of one of its parts appertaining to the separator; and Fig. 3 is an enlarged side-view in detail of the oil and water-outlet valves, and their stems in relation to each other.

Similar letters and numerals refer to similar parts throughout the drawings.

A, is the steam-engine of any construction.

B is the combustion-chamber and C the ash-pit chamber of the boiler-furnace and which can be of any construction usual in cases having the pipe inlets 1, and 2, respectively, after the manner observed in cases where a forced draft is employed in conjunction with an air or hydro-carbon supply introduced above the grates.

D is the furnace smoke-stack or chimney and is provided on its interior with the "jet-exhauster" or induced-draft nozzle, 3; this exhauster may be of any of the usual forms of steam-jet-exhauster known to the art and may be arranged in any suitable manner in the smoke and gas conduit from the furnace; but I prefer the manner shown in the drawings herewith.

E, is the hot-well chamber and E' is the combustion-blast reservoir chamber; these two chambers are preferably incased within the same outer-vessel or shell made in cylindrical form; said shell is provided with the inlet opening 4, and blast outlets 5, 6, 7 and 8; also water-outlet 9, dirt and grit outlet 10, and oil outlet 11; it is also provided with a water-level indicating-gage 12, and such hand-hole and man-hole openings as may be found convenient to place therein for access to its interior parts. Said shell is also provided in its interior with a separator F, for extracting the oil and water from the inflowing mixture from the condenser. Said separator consists of the conical deflector 13, which is fastened to said shell by brackets 14, so that a small space or opening exists between the bottom edge of said deflector and the shell hereinbefore described. On the upper surface of said conical deflector are mounted concentrically and at convenient distances apart, the cylindrical rings 15, of different diameters and located, in reference to the surface of said deflector, so that small spaces or openings exist between said surface and the bottom edge of said rings. Located concentrically above the apex of said conical deflector but in close proximity to said rings thereon, is the opening of the inlet-pipe 4 discharging from the condenser G, hereinafter described. Said pipe 4, terminates with a funnel-shaped opening 16, the wall of which projects some distance downwardly preferably in convergent lines with the upper surface of said conical deflector 13, to cause a slight reduction in opening area. The chamber below said deflector 13, and comprising the lower-end of said shell, constitutes the hot-well, as hereinbefore mentioned. The space within said shell above said conical deflector constitutes the combustion-blast reservoir, as hereinbefore mentioned. In the upper part of said hot-well underneath but within the periphery of the bottom edge of the conical deflector 13, is located the oil collector H; said oil collector consists preferably of a basin 17, having a flanged rim 18, forming its upper-edge and which is made to incline slightly from the horizontal and radially inward toward the basin-center. This flanged rim is for the purpose of presenting a large collecting area to the surface of the water on which the oil, by reason of its lighter specific gravity, floats and rising with the collected water of condensation comprises the first overflow, hereinafter referred to, that occurs therefrom into said basin. Within said basin is a ball-float 19, for operating in the first instance the water-outlet valve 20. This operation is effected by means of the lever 21, attached to said ball-float, and having attached to the axle 22, which forms the fulcrum for said lever, projecting arms 23,—one at each end of said axle—which arms extend one on each side of the valve-stem casing 24, for the purpose of engaging with studs 25, projecting from the valve-stem 26, of the valve 20; (see Fig. 3.) Said valve-stem 26 is spread in two branches, one being on each of the two opposite sides of the valve-stem casing 24, and reunited at the upper end and constructed so as to engage with the nuts forming a stop-collar 27 on the top end of the stem 30, of valve 28 of the oil outlet as shown in Fig. 3 and designed as the means for operating said oil-outlet-valve 28, from the motion of the valve 20. The opening 29, shown in the valve-stem 30, in Fig. 3, is for the purpose of giving clearance to the lever 21, moving in the same plane of action as does said valve-stem 30. Said valve 20, is also provided on its stem 26 with a piston 31, fitting loosely in the cylindrical chamber 32. The under side of said piston is in free communication with the hot-well chamber through the opening 33. The upper side of said piston constitutes one side or end of said chamber 32 and has a stop collar 34 which terminates the upward stroke of said piston travel on its coming in contact with the upper wall of said chamber 32; leading from said chamber 32 is a conduit 35 giving egress to the water contained in said chamber through the valve 20, upon its opening in the first instance as hereinbefore referred to and hereinafter further described, and whereby free communication is made between said chamber 32 and the water-outlet 9 without permitting an outflow of water from the hot-well chamber through the opening 33, and thus leaves necessary for such outflow a further upward movement of the valve 20. Said further upward movement, when occurring, also opens the oil drain valve 28, and is caused by the hydraulic pressure of the water of condensation in the hot-well chamber acting against the underside of the piston 31; and occurs upon the release of the hydrostatic-pressure existing against the upper side of said piston in the chamber 32. Said release is caused by the action of the overflow of oil and water on the ball float 19 reposing in the basin 17, which ball-float on rising actuates the lever 21 which in turn transmits said action through the arms 23, studs 25, and valve-stem 26 to the valve 20 causing the same to unseat, as described, and to admit of which said chamber 32 is provided with a valve 36, opening outward into the hot-well chamber. To admit of the unseating or opening of said valve 20 as above described said valve is made into a piston like form and fitted to move freely in the bore of the surrounding cylindrical chamber 37 formed by depressing the seat of the valve 20 below the inlet opening 33.

The first movement, made by the valve 20, at the instance of the overflow in the basin, as above described, occurs without unseating or disturbing the repose of the oil drain valve 28 but upon said further movement of valve 20, occurring at the instance of hydraulic pressure against the piston 31, as described, engagement is made by the valve-stem 26 coming in contact with the collar 27 on the valve-stem 30 and unseats or opens the oil outlet valve 28 whereby the oil and water collected in said basin 17 is drained from the same through the outlet 11, as is also the water collected in the hot-well drained therefrom through the opening and valve 20 and outlet 9. Said valves 28 and 20 both then remain open until the water in the hot-well chamber is drained down to such lower level as that at which its hydraulic head no longer yields sufficient pressure on the under-side of the piston 31 to sustain the weight of said valve 20 and its attachments when it then closes by gravity, bringing with it a closing of the valve 28 also, both of which then remain closed until the hot-well chamber again becomes filled to the level necessary for causing the above described overflow into the basin 17 of the oil-collector. When said overflow is repeated the opening of the valves 20 and 28, in the manner above described, is also repeated.

The effective area of the under side of the piston 31 is so proportioned in relation to the weight of the valve 20 and its attachments and the hydraulic head of the water in the hot-well, acting against said piston so that the valve 20 will close before the surface of the water, which carries more or less residual oil, would be carried out through the opening 33 and drain-outlet 9. In this manner the water of condensation is drawn from the hot-well in condition suitable for returning to the boiler as feed water and for which purpose the boiler-feed pump can be directly attached to the outlet 9 and an automatic opening and closing of the steam supply for actuating said pump be obtained by means of a suitable connection to the valve-stem 26 as will readily be understood by persons skilled in the art to which this invention appertains. The piston 31 is made to fit loosely into its chamber 32 to admit of leakage for filling said chamber as also that the same will be actuated easily. At the bottom of said hot-well and below the opening 33 is located the grit and sediment collecting basin 38. This basin is drained by means of the valve 39 and pipe outlet 10. The blast-mixture overflow or waste outlet opening 5 is connected to the pipe 40 leading to the atmosphere. This pipe is provided with a valve 41, having attached to it a pressure-regulating device consisting of the diaphragm 42, lever 43, chain 44, chain-wheel 45 and the counterweight 46, also the pipe 47 establishing communication between the chamber 48 and the interior of the combustion-blast reservoir E′. By adjustment of the counterweight 46 in reference to the degree of pressure desired in said blast reservoir E′ said valve 41 is automatically regulated by the pressure existing in said reservoir E′ acting through said pipe 47 on the diaphragm 42 which in turn actuates the valve 41 through the medium of the lever 43, chain 44 and chain-wheel 45; the counterforce being derived from the blast pressure on the valve gate, which opens outward, in conjunction with the counterweight 46.

The combustion-blast outlet-opening 6, is connected to the pipe 49, leading into the "jet-exhauster" or induced draft-nozzle 3 provided on the interior of the smoke-stack or chimney D, as hereinbefore described. Said pipe 49 is provided with a valve 50 having attached to it an automatic regulating device similar to that attached to valve 41 but having the pipe 51 giving communication between its diaphragm-chamber 52, and the interior of the pipe 49 at a point between the valve 50 and the nozzle 3. By adjustment of the counterweight 53, the degree of pressure in pipe 49 is automatically regulated by its own pressure acting through the pipe 51 on the diaphragm 54, similar in manner to that described for valve 41.

The combustion-blast outlet-opening 7 is connected to the pipe 55, leading to outlet-openings 56, discharging into the combustion-chamber B of the furnace. Said pipe 55 is provided with a valve 57, having attached to it an automatic regulating device, similar to that attached to valve 50, and is regulated in a similar manner by the pressure desired in said pipe 55 at points between said valve 57 and the outlet-openings 56.

The combustion-blast outlet-opening 8, is connected to the pipe 58, leading into the outlet-opening 2 discharging into the ash chamber C. Said pipe 58 is provided with a valve 59 having attached to it an automatic regulating device, similar to that attached to valve 50, and is regulated in a similar manner by the pressure desired in said pipe 58 at points between said valve 59 and the outlet opening 2.

G is the condenser hereinbefore referred to; it consists of a "steam-jet exhauster" constructed upon the same general principles which are involved in the ordinary steam-jet blowers and exhausters known in various forms to all persons skilled in the art, and may be arranged, in my herein described invention, in any suitable manner between the engine A and separator F hereinbefore described; but I prefer the arrangement shown in the drawings herewith and in which 60 is the jet nozzles, and 61 the steam-jet inlet from the exhaust-port of the engine.

62 is the injection air inlets, and 63 the injection air regulating valves; said valves 63 are so constructed as to be slightly overbalanced in their action toward the atmosphere.

64 is the ejection fluid outlet.

65 is a conduit for a free injection air supply from the atmosphere.

The operation is as follows:—The engine under the pressure of its normal release discharges its exhausted steam into the condenser jet inlet 61; this pressure and consequent velocity is sufficient to blow the discharge through all the nozzles 60, and thereby cause a strong influx current of injection air through the air-inlet-openings 62 and into the nozzles 60 with said steam whereby said steam becomes mixed with and condensed by said air; the air in turn becomes heated, by absorbing the heat freed from the condensed steam, and is charged with hydrogen existing in the aqueous vapor remaining uncondensed and which becomes intermingled with said air. In such condition and under the influence of the momentum caused by the combined velocity of the inflowing steam and air, said mixture of air and intermingled aqueous vapor is discharged, together with the water of condensation and oil of lubrication therein contained, through the ejection outlet 64 into and through the pipe 4 into the separator F. In the separator F, the condensed water and oil contained therein is deposited on the surfaces of the cylindrical rings 15 and of the conical deflector 13 and flows therefrom by gravity down into the hot-well chamber E while the air and aqueous vapor of said discharges collect in the blast reservoir E' (under the pressure due to the mass and velocity of the inflowing mixture through the pipe 4) from whence they are utilized, to the extent required, for obtaining a more perfect and rapid combustion of the fuel in the furnace, and the securing an increased amount of heat generated therefrom, than is obtainable by natural draft or by an equivalent expenditure for mechanical draft installation or equipment of other devices than is herein described and shown. The utilization of said blast by means of my herein described invention, is based upon the same general principles which are involved in the ordinary devices used for the injection of steam and air into the combustion chambers of furnaces and which devices are familiar in a great variety of forms to all persons skilled in the art. The introduction of said mixture of air and aqueous vapor from the blast reservoir E' into the combustion chamber B is effected above the grates through the pipe 55 and below the grates by the pipe 58; the form and detail of the outlets from said pipes into said chamber, respectively, can be after any suitable and appropriate form used in the injection of steam and air into furnaces for promoting combustion and attaining economy in the use of fuel; the regulation of the quantity and pressure of such injection being effected by the valves 57 and 59 as hereinbefore described.

By the application and use of my herein described invention all of the well known advantages resulting from the addition of hydrogen, together with a heated air, supplied under regulated pressure and volume to fuel under action of combustion are obtained without the expenditure of otherwise available energy and thus obviating the loss of efficiency and economy that occurs in the use of other devices heretofore known and used for purposes of artificial draft in motor plants of the class to which this invention relates.

The oil of lubrication, collected in the hotwell E, by reason of its lighter specific gravity floats upon the surface of the water and comprises the first overflow into the basin 17; should it be insufficient in quantity to fill the basin to the level necessary for causing the ball-float, reposing therein, to actuate the valve 20, as hereinbefore described, the continued rising of the collecting water of condensation supplies a sufficient overflow to fill the basin to the level necessary for so doing; said actuation consists in a slight opening movement of said valve 20 and is followed by a further and full opening movement as rapid as the emptying of the chamber 32, through the conduit 35, will permit, thereby opening, also, the oil drain valve 28, as hereinbefore described, whereby the oil and water are both drained out through their respective drain outlets as shown by the drawings and as hereinbefore described.

The draft inducing nozzle 3, shown in the chimney, together with the pipe 49, valve 50 and its adjuncts as also the opening 6 can be dispensed with without departing from the essence of my invention, but I prefer their use in the manner shown to avoid the collection of gases in the flues because of their liability to explosion on ignition as sometimes happens where forced furnace draft is employed through the combustion chamber.

The surplus blast is discharged to waste through the outlet opening 5 and pipe 40 leading to atmosphere.

Owing to the variable and intermittent character of an engine-exhaust discharge, both as to its volume and regularity of flow, it is necessary to regulate the quantity of the inflowing injection air into the suction and mixing nozzles 60. This regulation is effected automatically by means of the valves 63 hereinbefore described. Should the discharge of exhaust-steam from the engine be reduced below the full capacity of the condenser, it will be insufficient to cause a suction or current of air into all of the nozzles 60. There will be a suction into the first one, two, or more of the nozzles, according to the quantity and pressure of the inflowing steam; but from the others there will be an outward current or pressure, which will close their respective valves 63 and thereby shut off communication with the atmosphere and render them inoperative. By thus closing the communication of one or more of the nozzles with the air-supply conduit the condenser is reduced to the capacity corresponding to the magnitude of the discharge of exhaust-steam from the engine. Upon a recurrence of an increased volume of such steam exhaust the supply of injection air is correspondingly increased through the reopening of the valve or valves that were closed upon the reduction in the flow of the steam from the exhaust-port of the engine.

It will readily be understood that the use of the ordinary by-pass out-let can be connected between the engine and condenser in order to divert the exhaust-steam elsewhere than through the condenser should it be so desired to do.

It is obvious that many different forms of the several instrumentalities herein mentioned may be used to carry out my herein described invention and I do not limit nor confine myself to the precise forms herein shown and described.

What I claim as my invention, and desire to secure by Letters Patent of the United States, is—

1. In a steam-motor plant, the combination consisting of a steam engine cylinder having its exhaust port in communication with the atmosphere and with the combustion chamber of a furnace through the medium of an air mixing and steam condensing chamber, an oil water and aero-vapor separating chamber, and closed conduits or pipes having regulating-valves therein, each constructed substantially as shown and described and arranged and connected together in series as set forth.

2. In a steam-motor plant, the combination consisting of a steam-engine cylinder having its exhaust port in communication with the atmosphere through the medium or an air-mixing and steam-condensing chamber provided with air-inlet openings and air-inlet regulating valves and jet-nozzles, an oil water and aero-vapor separating chamber provided with a water and oil collector a sediment basin with a discharge valve and separate automatic intermittent oil and water and aero-vapor discharge valves and outlets, each constructed substantially as shown and described and arranged and connected in series as set forth.

3. In a combustion-blast apparatus for furnaces, the combination consisting of a steam-jet air blower, a water and aero-vapor separator connected to receive the discharge from said blower, water and blast reservoirs connected to said separator, blast-pipes or conduits having regulating valves therein and leading from said blast-reservoir to the atmosphere and to the combustion-chamber of a furnace respectively, water discharge conduit having regulating valves therein and leading from said water-reservoir to receptacle for receiving the water of condensation collected in and discharged from said water-reservoir, substantially as shown and described.

4. In a combustion-blast apparatus for furnaces, the combination consisting of the exhaust port of a steam-engine cylinder, a steam-jet air blower connected therewith so as to receive and be dependent upon the discharge from said exhaust-port for the operation of said blower, a water oil and aero-vapor separator having water and blast reservoirs and connected to receive the discharge from said blower, blast-pipes having regulating valves therein and leading from said blast-reservoir to the atmosphere and to the combustion chamber of a furnace respectively, water and oil discharge conduits having regulating valves therein and leading from said water and oil reservoir to receptacles respectively provided for receiving the water and oil collected in and discharged from said water and oil reservoir, substantially as shown and described.

5. In a separator for extracting water grit dirt &c. from steam or other gaseous substance, the combination consisting of a casing comprising an outer vessel or shell having located in its interior a conical deflecting surface provided with openings or space between the lower peripheral edge of said deflector and the inside surface of said shell, cylindrical rings of different diameters mounted on said conical deflector and having spaces or openings between the lower edge of said cylindrical rings and the outer-surface of said conical deflector, a sediment chamber or basin, a water collecting chamber, an inlet pipe terminating with a funnel shaped opening and located concentrically over said conical deflector and in as close proximity thereto as will admit a free discharge or passage of the inflowing current, discharge pipes with suitable valves for draining the water and other extracted matter collected in said collecting chambers respectively, and a steam or current discharge opening to allow the purified current to pass out of said shell, substantially as shown and described.

6. In liquid collecting and automatic discharging receptacles the combination consisting of an outer casing or inclosing vessel, the overflow basin 17, ball-float 19 reposing in said basin, lever 21 attached to said ball-float, axle 22 attached to and forming the fulcrum of said lever, arms 23 attached to said axle and projecting on each side of the valve-stem casing 24 and provided with seats for bearing or engaging with studs 25, valve-stem 30, valve-stem casing 24 forming a well around the said valve-stem 30, the engaging studs 25 projecting from the extended valve-stem 26, extended valve-stem 26 provided with side extensions for straddling the valve-casing 24 and for carrying the studs 25 and having its reuniting extension provided with a hole forming an actuating collar engaging with the stop-nuts 27 on the valve-stem 30 and as a means for actuating the valve 28, cylindrical valve 20, cylindrical valve-chamber 37, piston 31, cylindrical chamber 32, valve 36, conduit 35, outlet opening 9, substantially as and for the purpose shown and described.

ROBT. D. KINNEY.

Witnesses:
JOHN H. MYLIN,
GEORGE E. GOLDBECK.